US012777995B2

(12) United States Patent
Löbbert et al.

(10) Patent No.: US 12,777,995 B2
(45) Date of Patent: Nov. 3, 2026

(54) AGRICULTURAL IMPLEMENT

(71) Applicant: LEMKEN GmbH & Co. KG, Alpen (DE)

(72) Inventors: Johannes Löbbert, Haltern am See (DE); Georg Paulessen, Willich (DE); Georg Achten, Tönisvorst (DE)

(73) Assignee: LEMKEN GmbH & Co. KG, Alpen (DE)

( * ) Notice: Subject to any disclaimer, the term of this patent is extended or adjusted under 35 U.S.C. 154(b) by 198 days.

(21) Appl. No.: 18/846,906

(22) PCT Filed: Mar. 16, 2023

(86) PCT No.: PCT/DE2023/100206
§ 371 (c)(1),
(2) Date: Sep. 13, 2024

(87) PCT Pub. No.: WO2023/174490
PCT Pub. Date: Sep. 21, 2023

(65) Prior Publication Data

US 2025/0194453 A1 Jun. 19, 2025

(30) Foreign Application Priority Data

Mar. 16, 2022 (DE) ..................... 10 2022 106 209.0

(51) Int. Cl.
*A01B 73/04* (2006.01)
*A01B 73/06* (2006.01)

(52) U.S. Cl.
CPC .......... *A01B 73/048* (2013.01); *A01B 73/065* (2013.01)

(58) Field of Classification Search
CPC ............................ A01B 73/048; A01B 73/065
See application file for complete search history.

(56) References Cited

U.S. PATENT DOCUMENTS

| | | | | |
|---|---|---|---|---|
| 4,206,816 | A * | 6/1980 | Richardson | A01B 73/046 172/674 |
| 8,235,133 | B2 | 8/2012 | Friggstad | |
| 8,342,256 | B2 * | 1/2013 | Adams | A01B 73/065 172/311 |
| 9,433,139 | B2 * | 9/2016 | Stettner | A01B 73/044 |
| 10,912,242 | B2 * | 2/2021 | Achten | A01B 21/086 |
| 2016/0081261 | A1 | 3/2016 | Paulessen et al. | |
| 2017/0354085 | A1 | 12/2017 | Schlimgen et al. | |
| 2019/0133025 | A1 | 5/2019 | Lopan et al. | |

FOREIGN PATENT DOCUMENTS

| | | | | |
|---|---|---|---|---|
| CA | 2283235 | A1 | 9/1998 | |
| DE | 102005026812 | A1 | 1/2007 | |
| DE | 202015007932 | * | 1/2017 | |
| DE | 202015007932 | U1 * | 1/2017 | A01B 73/048 |
| EP | 2113159 | A1 | 11/2009 | |
| EP | 3476203 | A1 | 5/2019 | |
| WO | 2013036191 | A1 | 3/2013 | |
| WO | 2014173388 | A2 | 10/2014 | |

* cited by examiner

*Primary Examiner* — Nicole Coy
(74) *Attorney, Agent, or Firm* — Smartpat PLC

(57) ABSTRACT

An agricultural implement (1) includes depth guide elements (17) which can be pivoted relative to the implement (1) via a hinge unit (18), but are automatically locked and secured against a pivot movement in the working position by the dead weight of the implement (1) bearing down on the depth guides (17).

10 Claims, 6 Drawing Sheets

AGRICULTURAL IMPLEMENT

CROSS-REFERENCE TO RELATED APPLICATION

This application is a national stage application, filed under 35 U.S.C. § 371, of International Patent Application PCT/DE2023/100206, filed on Mar. 16, 2023, which claims the benefit of German Patent Application DE 10 2022 106 209.0, filed on Mar. 16, 2022.

TECHNICAL FIELD

The application relates to an agricultural implement.

BACKGROUND

Agricultural machines frequently exceed the dimensions that are permitted on public roads and are therefore provided with foldable or collapsable machine frames in order to bring these from a wide or expansive working position exceeding the permitted dimensions into a narrow transport position, which corresponds to the permissible dimensions.

The German disclosure DE 10 2005 026 812 A1 shows an agricultural soil cultivation implement with large working width having a folding frame and soil cultivation tools arranged thereon. A chassis frame is arranged before the same. For the road transport, the folding frame, in a first step, is brought into a vertical position and the outer segments of the same folded forward in a following step in order to satisfy the permitted vehicle width.

The disclosure EP 2113159 A1 shows a similar soil cultivation implement with large working width which, according to FIG. 1, consists of a middle and two outer frame segments arranged adjacently, with depth guide elements arranged thereon. The folding from a working position into a transport position takes place as previously described regarding DE 10 2005 026 812 A1. In order to achieve a permissible height in the folded state, the depth guiding and flattening elements which, in the working position, protrude backwards, are pivoted about an axis and reduce the overall height in the transport position, after which, for each segment, multiple safety bolts have been released. Soil cultivation implements are known, in the case of which in the headland roller-like depth guide elements are used instead of a chassis, in order to support the lifted implement on the roller body during a turning manoeuvre. At least for reverse travel, the depth guide elements have to be locked relative to the implement in order to prevent an unintentional pivoting of the depth guide elements. For this purpose, an operator has to manually actuate the locking mechanism.

SUMMARY

An object of the disclosure is to provide an agricultural implement in which implement parts protruding backwards in the working position, which by folding assume a transport position in particular an upper or less protruding position, do not exceed a permissible transport height of the agricultural implement. The protruding implement parts such as for example depth guide elements should be locked or unlocked automatically.

This object is achieved through the features of the implement as disclosed and claimed.

An agricultural implement, which by means of a lifting device can be lifted from a working position into a lifted position or conversely can be lowered back into the working position, comprises a frame. The frame can be designed in one or multiple parts and comprise further auxiliary frames or part segments, which can also be arranged so as to be moveable relative to one another. The frame is assigned multiple working tools preferentially oriented in a tool plane. Downstream of the working tools of the agricultural implement, depth guides are arranged, with which in a working position of the implement the distance of the working tools to a ground surface can be adjusted or changed. Between the frame and the depth guides, at least one hinge unit and one locking mechanism are arranged, by means of which the depth guides are locked in the working position relative and immovably to the frame and, when transferred from the working position into a lifted position of the implement, can moveably swing or pivot towards the frame or the working tools by means of the hinge unit. The locking is passive and configured so as to be releasable by lifting the implement or the frame. Thus, a locking of the depth guides required in working position of the implement is again unlocked by lifting the implement or its frame or parts thereof. No direct or active actuation of a locking mechanism by an operator or a sequence control is required, which significantly lowers the complexity and manufacturing costs of the agricultural implement. At the same time, the reach of the depth guides when lifting the implement is shortened in favour of a lower lifting force requirement. The reduced reach of the depth guides also brings about a reduced transport height of the agricultural implement. In an advanced form of the implement, the locking mechanism comprises at least one protrusion and one recess. The protrusion and the recess can interlock in a locking position and prevent movement between the projection and the recess in a first direction. Furthermore, a release position of the locking mechanism is achieved through a movement between the projection and the recess in a second direction. In this release position, the projection and the recess can be moved past one another along the first direction.

In a further form of the implement, the projection and the recess are configured in such a manner that their movement in the first direction and the second direction are arranged so as to run in a common plane. Releasing and locking the locking mechanism and moving the components involved merely occurs in a two-dimensional area. Accordingly, the device is less complex and can thus be constructed easily and with few means.

In an improved embodiment of the preceding forms of the implement, further guiding means are arranged at least indirectly between frame and depth guides for this purpose. The guiding means are designed for guiding and/or limiting a movement of the depth guides in the region of the locking mechanism in the first direction and/or the second direction. The guiding means can be designed as slotted link guide, moveable straps, limit cables or chains, as stops or as link mechanism. Combinations of aforementioned means are also possible. Decisive is the suitability of the means of predetermining or defining a movement along a certain path curve or guiding direction and/or prevent such along an unintended guiding direction.

In a further form of the implement, the locking mechanism or parts thereof are configured hook-shaped and moveable. Preferably, the movement of the hook-shaped locking mechanism is assisted by an energy store. The movability of the locking mechanism makes possible accurate engaging and locking while the locked state of the locking mechanism is established or achieved. This occurs for example when the implement is lowered while the depth guide element already stands on the ground. An unlocking when lifting the implement takes place without at least substantial movement of the actual hook-shaped locking mechanism from its locking position.

In a form for large working widths for the implement, the same is designed so as to be in multiple parts and foldable. At least one first boom and a second boom are connected to the frame in a foldable or pivotable manner. The implements and depth guides are preferably assigned to the respective booms. Thus, the implement can be brought from a large working width, which exceeds the permissible dimensions for road traffic, into a transport position permissible for road transport.

In a further form of the implement, the frame of the implement comprises a first tilting frame which is arranged so as to be pivotable or tippable about a tipping axis transversely or perpendicularly to a center plane of the implement. The booms of the implement are arranged so as to be pivotable about a pivot axis, which extends pivotably largely parallel to the center plane of the implement. In particular semi-mounted implements, which comprise a drawbar and a transport axle, which in the working position are arranged in front of the working tools, can be folded upwards in a first folding operation, wherein the booms then standing upright with the working tools and depth guides attached thereon, can in a further step be pivoted forward into the final transport position.

Furthermore and preferably, the depth guides are designed as double roller unit, which via a pendulum compensation for offsetting ground irregularities is connected to the booms. The pendulum compensation is preferentially provided with a bogie which is located in the middle region of the double roller unit and is connected to the respective boom via at least one support frame.

Alternatively, the depth guides, which are arranged downstream of the working tools of the agricultural implement, are arranged by means of a link mechanism in such a manner that the position of the depth guides to the working tools are designed so as to be adjustable or changeable in terms of distance and/or inclination. Thus, an instantaneous pole of the links of the link mechanism can preferentially be placed into the region of the depth guides. In the event of links arranged parallel to one another, a height and/or distance adjustment of the depth guides can take place jointly with further additional tools, such as for example levelling tools.

In a further embodiment, the working tools and/or the depth guides are assigned flattening, impact, jamming and/or harrowing tools. Thus, the working result of the agricultural machine, in particular the working or processing of agricultural material onto or into the ground surface can be further improved and optimised.

Further details and advantages of the subject of the invention are obtained from the following description and the associated drawings, in which an exemplary embodiment with the details and individual parts necessary for this purpose are shown.

DETAILED DESCRIPTION

The representations are substantially concrete exemplary embodiments. The invention, by contrast, is not restricted to the shown exemplary embodiments but can also be expertly modified in order to adapt them to a certain application case.

Figure 1:
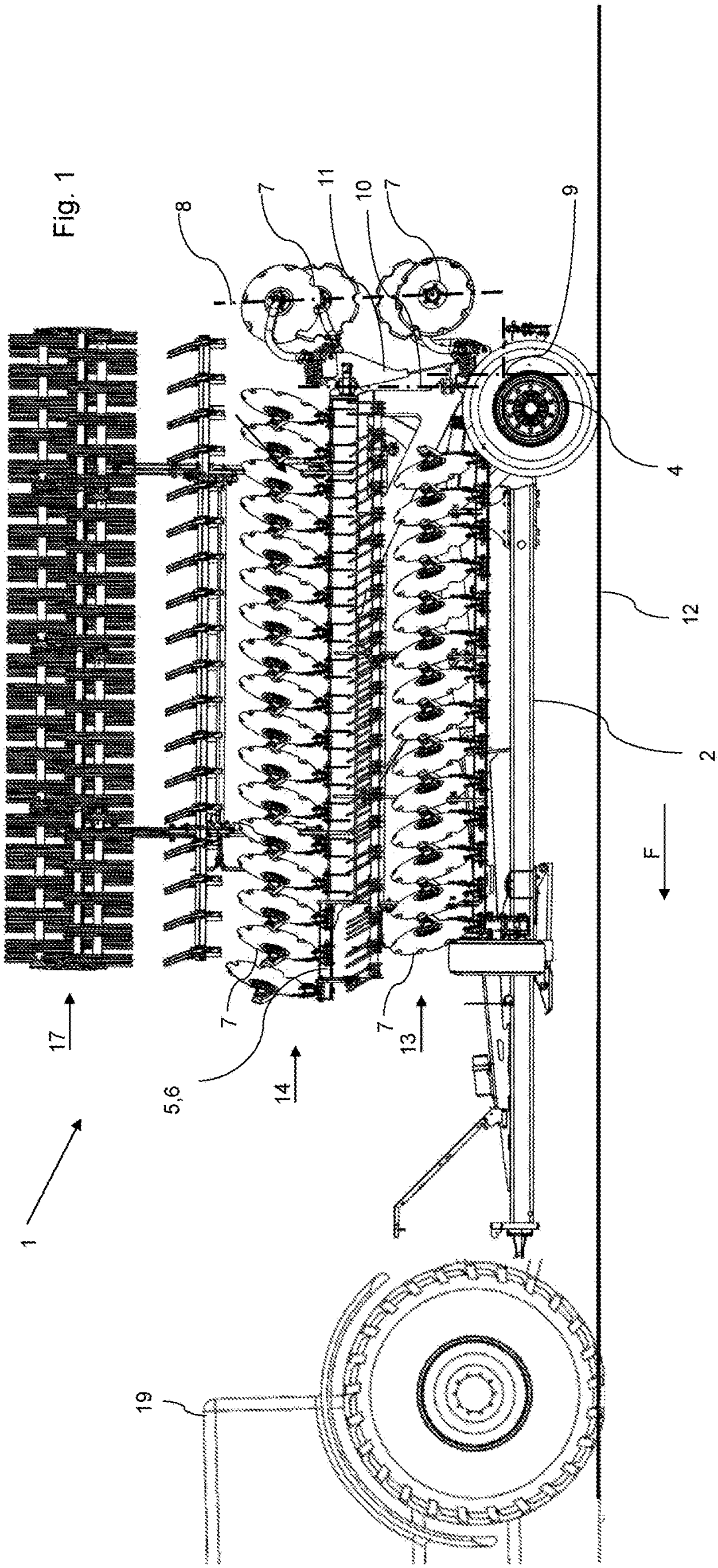
FIG. 1 shows an agricultural implement in transport position in lateral view.

FIG. 1 shows an agricultural implement 1 with a load-bearing frame 2, which in the rear region is supported with a chassis 4 on a ground surface 12 and in the front region has been hitched with a drawbar to an agricultural traction machine 19, which provides the locomotion of the agricultural implement 1 in the travelling direction F. The drawbar is V-shaped and designed as an integral part of the frame 2. Alternatively, a separate drawbar that is moveable laterally and in the height can be provided. Near the chassis 4, a tilting frame 11 is arranged, which is connected to the frame 2 so as to be pivotable or tiltable about the axis 9. On the tilting frame 11, some working tools 7 are arranged, which are formed as rotatable hollow discs and the centers of which lie in a common tool plane 8 or form the same.

By means of hinge joints—seen in the travelling direction F—on the left and right a boom 5 and 6 each is pivotably attached to the tilting frame 11. The right boom 6 is largely covered by the left boom 5 in the lateral view. The hinge joints each form a joint axis 10 about which the booms 5 and 6 can be pivoted out sideways into an intermediate position. In the transport position, the pivot axes 10 stand approximately perpendicularly to the ground surface 12. Thus, the necessary moments and adjusting forces for pivoting-out the booms 5 and 6 into the intermediate position or back are minimised. In the shown transport position, the booms 5 and 6 lie parallel to the travelling direction F along the frame 2 and, in the front region of the same, are supported in their end position on a cross member. The booms 5 and 6 are each equipped with working tools 7 in a first tool row 13 and a second tool row 14. Alternatively to the abovementioned hollow discs, the working tools 7 can also be configured as tines, coulters, seeding tools or for working or cutting plant material. Above the booms 5 and 6 or the working tools 7, depth guide elements 17 designed as rollers are arranged and, preferentially adjustably, connected to the respective booms 5 and 6. In the pivoted-out intermediate position of the booms 5 and 6, the centers of the working tools 7 jointly with the working tools 7 of the tilting frame 11, form the tool plane 8.

Figure 2:
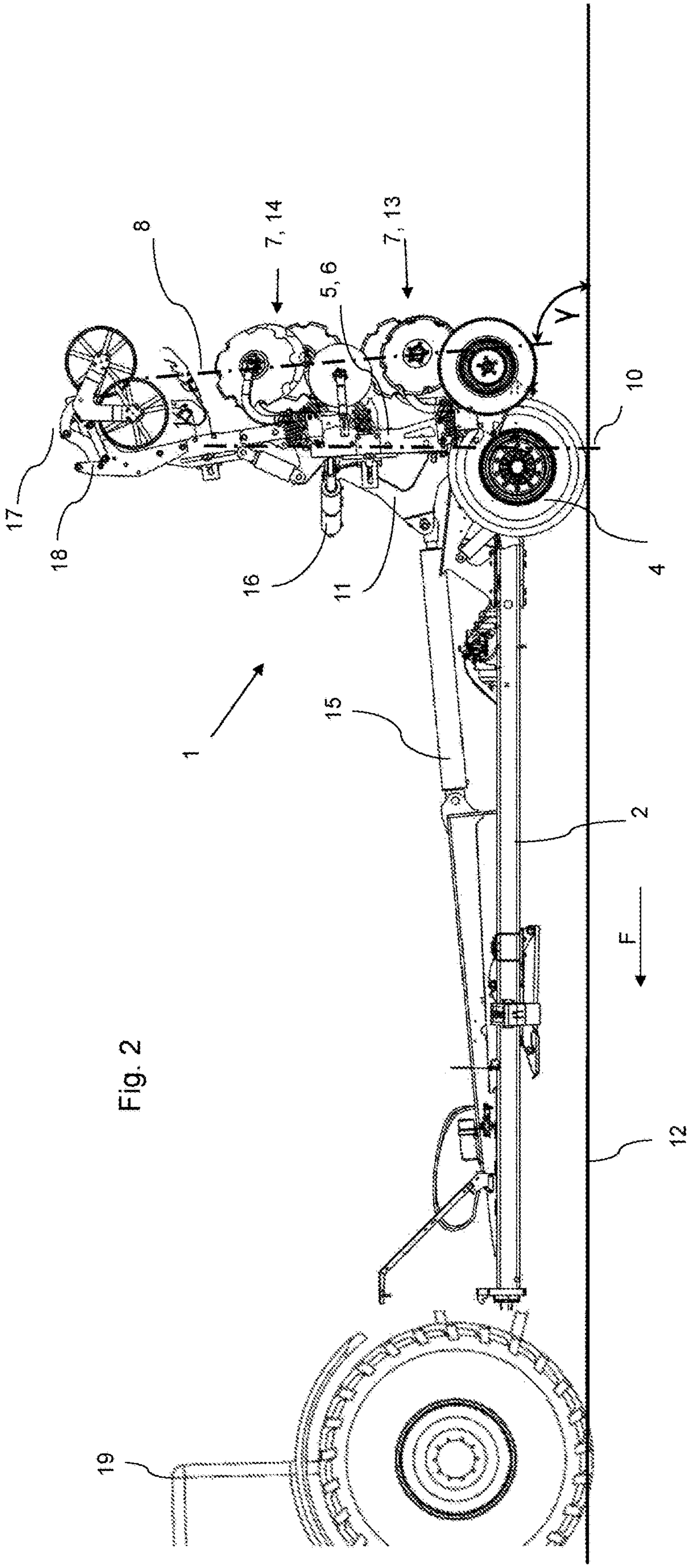
FIG. 2 shows the agricultural implement from FIG. 1 in a partly folded intermediate position.

FIG. 2 shows the agricultural implement from FIG. 1 in a partly folded intermediate position, likewise in lateral view. The booms 5 and 6 are pivoted out by means of the actuators 16 designed as hydraulic cylinders, which are arranged between the tilting frame 11 and the booms 5 and 6, from the orientation (transport position) running parallel to the travelling direction F into the shown orientation (intermediate position) running perpendicularly to the travelling direction F. Here, too, the respective pivot axes 10 of the tilting frame 11 are oriented perpendicularly to the ground surface. The actuator 15 likewise designed as hydraulic cylinder, hidden in FIG. 1, which is arranged in an articulated manner between the frame 2 and the tilting frame, holds the tilting frame 11 in this intermediate position or the transport position from FIG. 1. At the upper or rear end of the booms, the depth guides are arranged. To avoid these projecting over the permissible vehicle height the same are folded further down by means of the hinge units 18. With the actuator 15, the tilting angle γ can be adjusted in such a manner that on the one hand the pivot axes 10 for the transport and intermediate position stand perpendicularly to the ground or the booms can be pivoted parallel to the ground surface and on the other hand the booms and the tilting frame with the working tools arranged in tool rows 13 and 14 thereon, can be lowered into the working position as shown in the following regarding FIG. 3. The tilting angle γ is exemplary dimensioned between the tool plane 8 and the ground surface but generally describes the tilting angle of the tilting frame 11.

Figure 3:
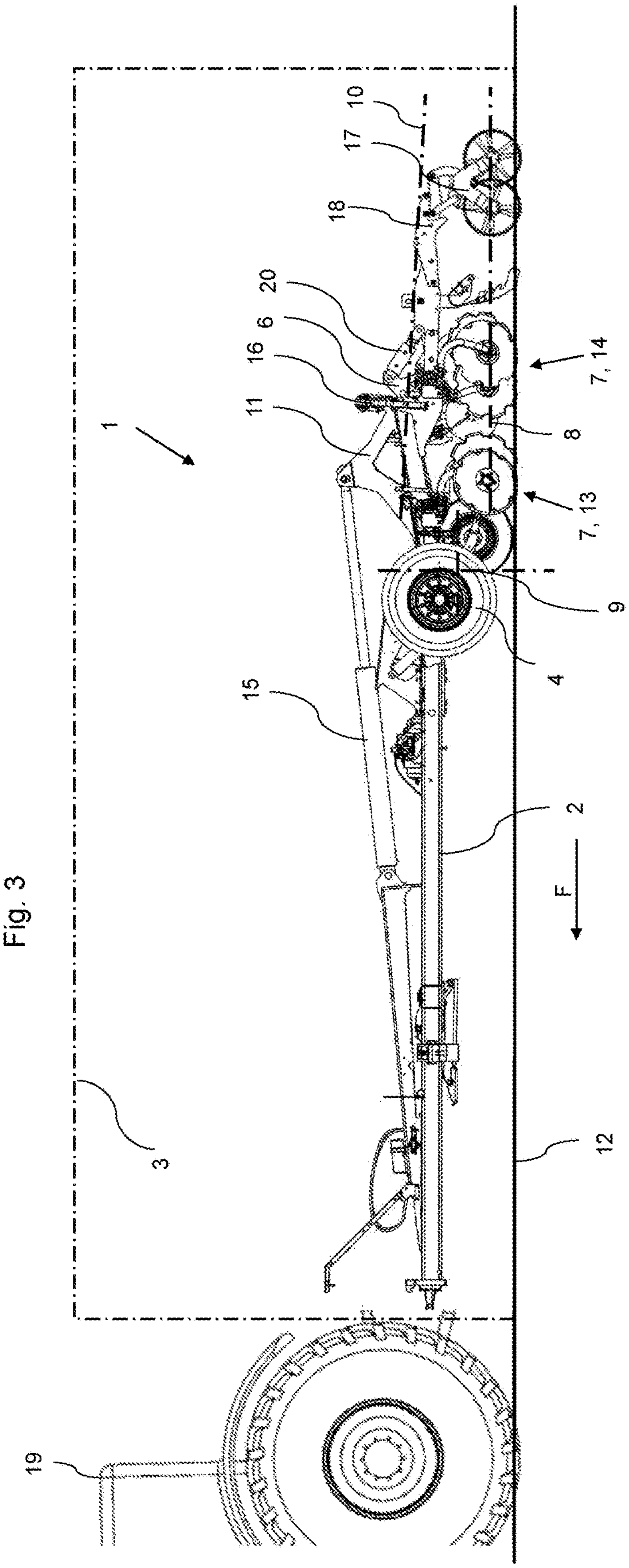
FIG. 3 shows the agricultural implement from FIG. 1 in working position.

FIG. 3 shows the previously mentioned working position of the agricultural implement 1. Here, the tilting frame 11 is lowered relative to the frame 2 about the tilting axis 9 by means of the actuator 15. In this position, the working tools 7 or their tool plane 8 are oriented parallel to the ground. The pivot axes 10 have an inclined position relative to the tool plane 8 as angle β, which maximally amounts to 10°, preferably approximately 1° to 5°. The tilting frame 11 is lowered so far that the pivot axes 10, seen in the travelling direction, are inclined by the angle β backwards towards the ground surface 12 since the same, as shown in FIG. 3, runs parallel to the tool plane 8. In the case of possible ground irregularities, the orientation of the tool plane 8 can be suitably adjusted by the actuator 15. The first tool row 13 and the second tool row 14, seen in the travelling direction F, are arranged one after another behind the tilting axis 9, behind which follow the depth guides 17, which are designed for example as rotatable rollers. In the present case, a double roller with roller rings overlapping into one another is shown. This double roller can comprise a bogie joint or, as shown, a link mechanism in order to likewise offset ground irregularities or inclination differences of the tool plane 8. By further readjusting the actuator 15, the tool plane 8 can be adjusted in such a manner that the working tools are at least partly lifted from the ground and the entire implement merely supports itself on the depth guides 17 and at the field end can be turned on the same. Complementarily, the depth guides 17 comprise one or more actuators 20 or locking mechanism, with which their position relative to the booms and thus the working depth of the working tools 7 can be changed. A lifting of the working tools 7 and thus a turning on the depth guides 17 is possible also by extending the actuators 20. When lifting the booms 5 and 6 back into the intermediate position, the depth guides 17 can fall downwards by means of a hinge unit 18 and shorten the reach backwards against the travelling direction F. In this view, the center plane 3 is also visible which also forms the symmetry plane of the agricultural implement 1 or its center frame 2 as well as of the tilting frame 11. The booms 5 and 6 with their working tools 7 and depth guides 17 extend to the right and left of the center plane 3 and define the working width of the implement 1.

Figure 4:
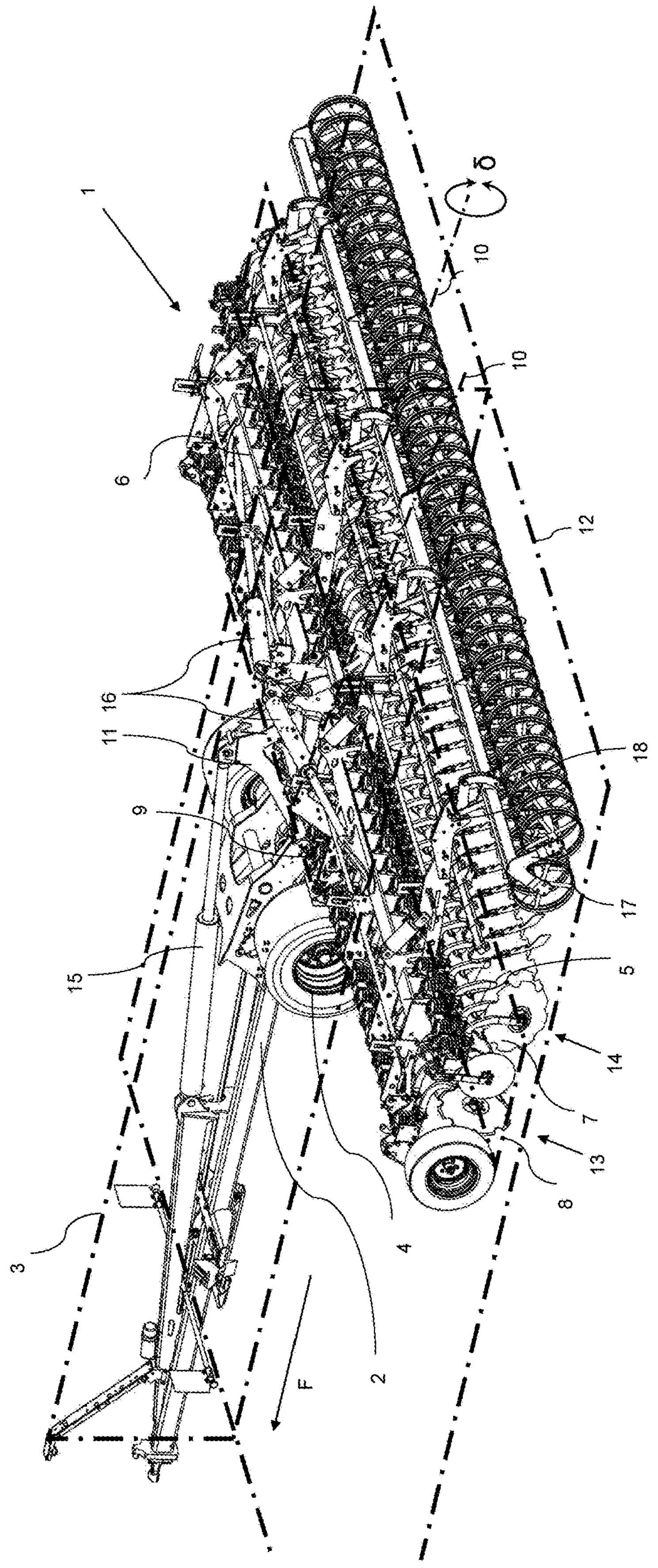
FIG. 4 shows the agricultural implement from FIG. 3 in a perspective representation.

FIG. 4 shows the agricultural implement in working position in a perspective obliquely from behind, as it is moved on the ground surface 12 shown as plane in the direction F. The center plane 3, which simultaneously forms the symmetry plane, from which each the left boom 5 and the right boom 6 with the tool rows 13 and 14 and corresponding depth guides 17 extend away to the outside stands perpendicularly to the ground surface 12 and parallel to the travelling direction. With the angle δ, a pivot movement of the boom 5 and 6 about the pivot axes 10 of the tilting frame 11 is shown, with which the booms 5 and 6, by means of the depth guide elements 17, can follow terrain irregularities or intersected terrain of the ground surface 12, which extend along the center plane 3.

Figure 5:
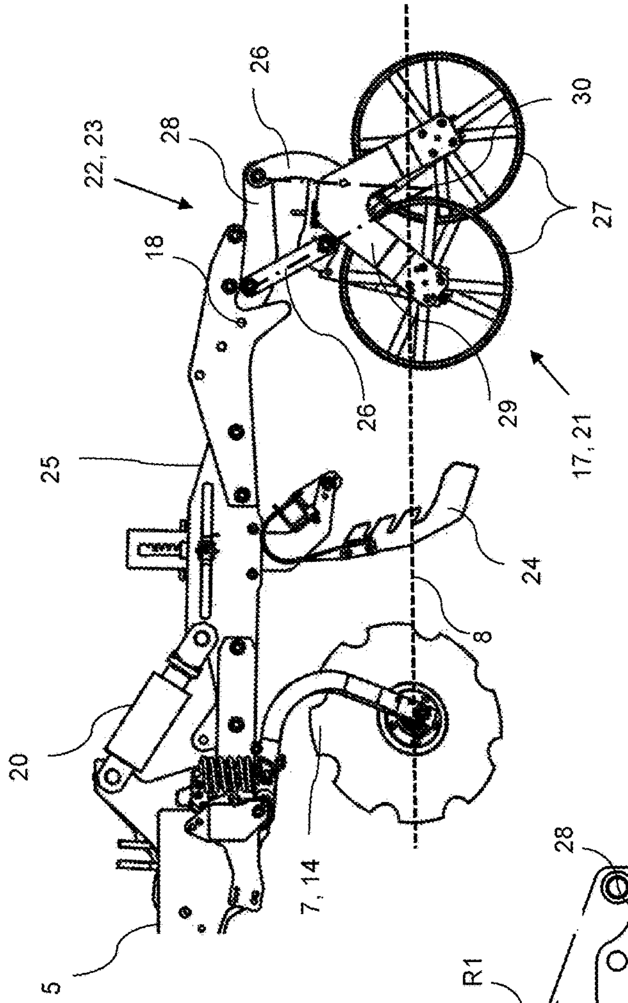
FIG. 5 shows a detail of the depth guides from FIG. 3, FIG. 6, FIG. 7 & FIG. 8 show a detail of the locking mechanism from FIG. 5.
Figure 8:
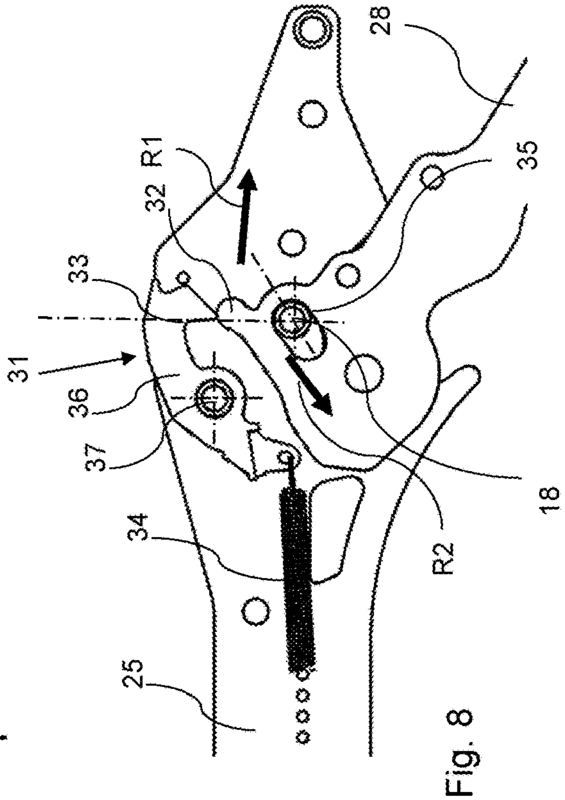

FIG. 5 shows the rear part region of a boom 5 in lateral view. By way of a pivotable support arm 25, which is actuated by means of a actuator 20, the depth guides 17 can be adjusted in the height relative to the working tools 7 or the tool plane 8. At the same time, the working tools 7 can be lifted above the ground surface 12 so far that the implement on the depth guides 17 designed as roller can be turned or moved in reverse. Preferably, the actuator or actuators 15 or 20 are designed as multi-piston or memory cylinder for this purpose. The depth guides 17 designed here for example as double roller unit 21 is pendulum-suspended by means of a link mechanism 23. The double roller unit 21 is formed out of a roller frame 29 and two rollers 27 rotatably mounted thereon. Each of these comprise pressure rings arranged on an axle offset relative to one another. These overlap one another with their diameters and are thus self-cleaning. The support arm 25 or a stop 28 as well as the frame 29 of the double roller 21 jointly with two suspension-mounted links 26 form a four-bar link mechanism 23. The two links 26 converge in an instantaneous pole 30, which forms the pendulum compensation 22. Between the rear tool row 14 and the depth guides 17 a height-adjustable harrow as levelling tool is installed. By way of the hinge 18, the stop 28 is connected in an articulated manner to the support arm 25 and, as shown, delimited in the upward movement by the same. When the boom 5 is lifted above the ground surface, the stop 28 can pivot through downwards jointly with the depth guides 17 and in the direction of the working tools 7, as shown in FIG. 8 and, in the upright folded position in FIG. 9, analogously to FIG. 2. The support arm 25 is oriented approximately parallel to the tool plane 8 and oriented in the angle α obliquely to the center plane 3, as already described and shown before. Through the pendulum movement of the stop 28 about the axis of the hinge 18 and the links 26, the depth guide element 17 falls into a lower transport position, which has a reduced transport height or a reduced distance to the working tools 7. The diameter of the roller 27 projecting outwardly over the tool plane 8 remains within a permissible transport width since the projection is offset by the inclined position of the tool plane 8. Alternatively to the shown stop 28 from FIG. 9, the same can also interact at the other end of the link 26 jointly with the roller frame 29. By a skilful selection of the hinge, stop and link arrangements, the reach of the depth guide elements 17 upwards and sideways can be optimised. An axis of the hinge 18 can be space and cost-savingly combined jointly with a fulcrum of a link 26.

Figure 6:
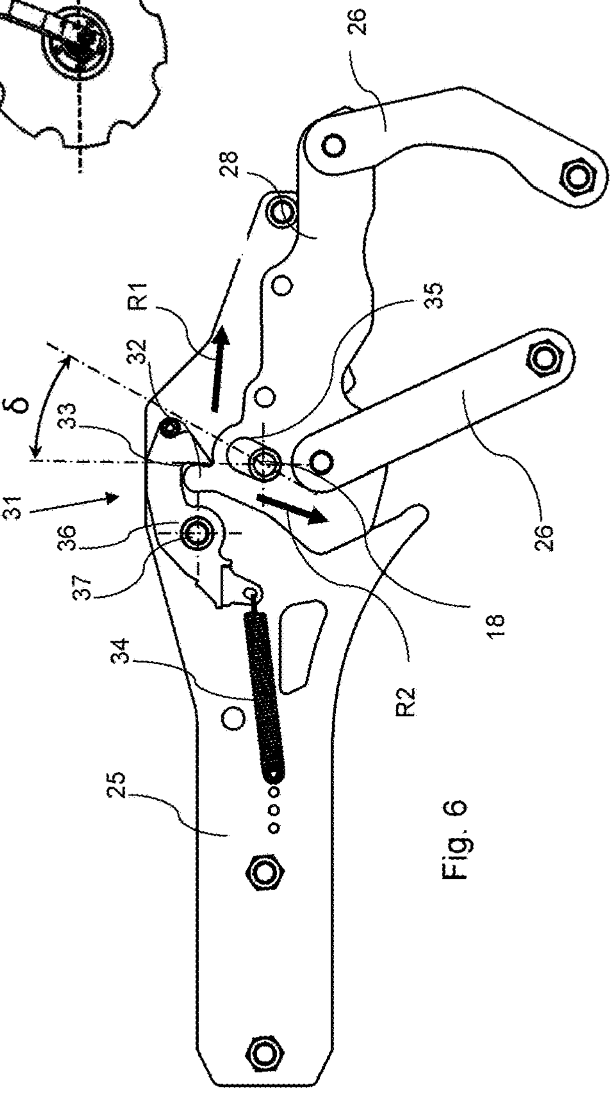

For better understanding, FIG. 6 shows the locking mechanism 31 as partially cleared extract from FIG. 5 in locked position. On a support arm 25, a hook 36 is pivotably or rotatably mounted about the pivot axis 37 and a stop 28 rotatably about the hinge unit 18. The hook 36 comprises a recess 33 which corresponds to a projection 32 of the stop 28. The recess 33 and the projection 32 interlock in such a manner that a movement or pivoting of the stop 28 in a first direction R1 is prevented. The hook 36 is held in the shown position by the preloaded energy store 34 designed as tension spring. The stop 28, which is mounted to the support arm 25 so as to be pivotable downwards about the hinge unit 18 extends from the support arm 25 towards the back. The pivotability of the stop 28 is delimited upwards by the end of the support arm 25. The depth guide element 17 is fastened to the stop 28 by means of the links 26, as already described and shown in the previous figures. When the stop 28 pivots out of an unlocked position, such as occurs upon transition from a lifted transport position into the working position of the implement 1, the hook 36 can rotate about the pivot axis 37 and yield upwards against the force of the energy store 34 and then pivot back into the shown end position. Furthermore, the stop 28 has a slotted link 35 configured as elongated recess. The same encloses the hinge unit 18 configured pin or bush-like which in turn is fastened to the support arm 25. The main expansion direction of the slotted link 35 is oriented obliquely to the contact surface between recess 33 and projection 32 in order to avoid canting between hook 36 and stop 28. The main expansion direction of the slotted link 35 simultaneously represents the movement freedom of the support arm 25 along a second direction R2. Preferably, the inclined position δ of the contact surface relative to the main expansion direction of the slotted link 35 is between 1 and 45°, further preferably between 10 and 30° and in particular between 15 and 20°. Furthermore, the contact surface between recess 33 and projection 32 is oriented approximately radially to the center of the hinge unit 18 in order to avoid a spontaneous unintentional unlocking.

Figure 7:
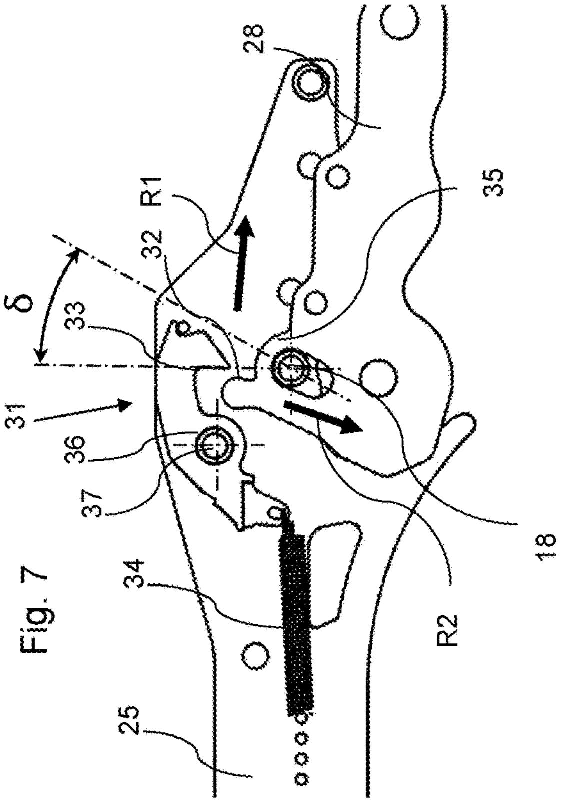

FIG. 7 shows the same locking mechanism 31 from FIG. 6 in unlocked position. Through the lifting of the implement 1 including its support arm 25, the depth guides 17 with its weight initially remains on the ground surface 12 and thus pulls the stop 28 downwards. Together with the stop 28, the projection 32 moves out of the recess 33 along the second direction R2. Through this translational offset, the stop 28 can subsequently pivot about the center point of the hinge unit 18 backwards in the direction of the first direction R1 during the course of the further lifting movement of the implement.

FIG. 8 shows the same locking mechanism 31 from FIG. 6 and FIG. 7 in unlocked position, wherein the stop 8 is now pivoted into the lowermost position about the hinge unit 18. Then, the upper edge of the projection 32 touches the lower edge of the hook 36 or its recess 33 and slightly lifts the hook 36 against the spring force of the energy store 34. The upper edge of the projection 32 is rounded in order to be able to better slide past the lower edge of the hook 36 or its recess 33. During the lowering of the implement 1, this makes possible an accurate engagement of the hook 36 or the locking of the locking mechanism 31.

Figure 9:
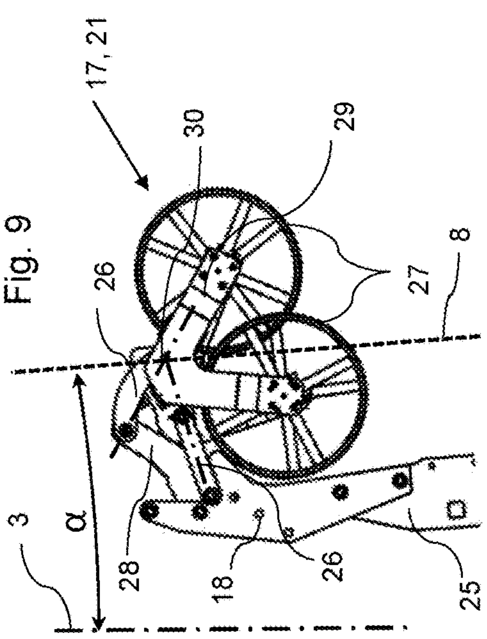
FIG. 9 shows a detail of the depth guides analogous to FIG. 2.

In FIG. 9, the unlocked situation from FIG. 8 is shown in the upright position including the depth guides. The locking operation of the locking mechanism during the lowering of the implement 1 can be retraced from FIGS. 9 and 8 via FIG. 7, until the depth guide element 17 touches the ground and the locking state of the locking mechanism from FIGS. 6 and 5 and thus the working position of the implement from FIGS. 4 and 3 are reached again.

LIST OF REFERENCE NUMBERS

1 Agricultural implement
2 Frame
3 Center plane
4 Chassis
5 Boom
6 Boom
7 Working tool
8 Tool plane
9 Tilting axis
10 Pivot axis
11 Tilting frame
12 Ground surface
13 Tool row
14 Tool row
15 actuator
16 actuator
17 Depth guides
18 Hinge unit
19 Traction vehicle
20 Actuator
21 Double roller unit
22 Pendulum compensation
23 Link mechanism
24 Harrowing tools
25 Support arm
26 Link
27 Roller
28 Stop
29 Frame
30 Instantaneous center
31 Locking mechanism
32 Projection
33 Recess
34 Energy store
35 Slotted link
36 Hook
37 Pivot axis

The invention claimed is:

1. An agricultural implement (1), configured to be lifted from a working position into a lifted position or lowered from the lifted position into the working position by a lifting device (15, 20), comprising:
a frame (2, 11);
multiple working tools (7) oriented in a tool plane (8) connected to the frame (2, 11);
depth guides (17) separate from and connected to the working tools (7) and arranged behind the multiple working tools (7) for adjusting or changing a distance of the multiple working tools (7) to a ground surface (12) in the working position of the agricultural implement (1); and
a hinge unit (18) and a locking mechanism (31) arranged between the frame (2, 11) and the depth guides (17),
wherein the depth guides (17) are locked against swinging or pivoting relative to the frame (2, 11) about the hinge unit (18) by the locking mechanism (31) when the agricultural implement (1) has been lowered into the working position,
wherein the locking mechanism (31) is released by lifting the agricultural implement (1) from the working position, and, after the locking mechanism (31) has been released, the depth guides (17) are movable to swing or pivot towards the frame (2) or the multiple working tools (7) about the hinge unit (18), and
wherein the locking mechanism (31) is configured so as to be passive such that the locking mechanism (31) is released by lifting the agricultural implement (1) from the working position without direct actuation of the locking mechanism (31).

2. The agricultural implement according to claim 1,
wherein the locking mechanism (31) comprises a projection (32) and a recess (33),
wherein the projection (32) and the recess (33) interlock in a locking position and prevent a movement between the projection (32) and the recess (33) in a first direction (R1), and
wherein a movement between the projection (32) and the recess (33) in a second direction (R2) reaches a release position of the locking mechanism (31), in which the projection (32) and the recess (33) can be moved past one another along the first direction (R1).

3. The agricultural implement according to claim 2, wherein the projection (32) and the recess (33) are designed in such a manner that their movement in the first direction (R1) and the second direction (R2) are arranged so as to run in a common plane.

4. The agricultural implement according to claim 2, wherein guiding means are arranged between the frame (2) and the depth guides (17), and wherein the guiding means guide and/or limit a movement of the depth guides (17) in a region of the locking mechanism (31) in the first direction (R1) and/or the second direction (R2).

5. The agricultural implement according to claim 1, wherein the locking mechanism (31) is hook-shaped and moveable.

6. The agricultural implement according to claim 1, wherein the implement (1) is designed in multiple parts so as to be foldable, wherein a first boom (5) and a second boom (6) are connected to the frame (2, 11) so as to be foldable or pivotable and working tools (7) and depth guides (17) are connected to the booms.

7. The agricultural implement according to claim 6, wherein the frame (2) of the implement (1) comprises a first tilting frame (11), wherein the first tilting frame (11) is arranged so as to be pivotable or tiltable about a tilting axis (9), wherein the tilting axis (9) is arranged transversely or pivotably to a center plane (3) of the implement (1), wherein the booms (5, 6) are arranged so as to be pivotable about a pivot axis (10), and wherein the pivot axis (10) pivotably runs largely parallel to the center plane (3) of the implement (1).

8. The agricultural implement according to claim 6, wherein the depth guides (17) are double roller units (21), and wherein the double roller units (21) are connected to the first boom (5) and the second boom (6) via a pendulum compensation (22) for offsetting ground irregularities.

9. The agricultural implement according to claim 1, wherein the position of the depth guides (17) relative to the working tools (7) is adjustable or changeable in distance and/or inclination by a link mechanism (23).

10. The agricultural implement according to claim 1, wherein flattening and/or harrowing tools are connected to the working tools (7) and/or the depth guides (17).

* * * * *